United States Patent
Kunz et al.

(10) Patent No.: US 9,637,669 B2
(45) Date of Patent: May 2, 2017

(54) POLYCRYSTALLINE POROUS AL₂O₃—BODIES ON THE BASIS OF MOLTEN ALUMINUM OXIDE COMPRISING AN INCREASED TOUGHNESS AND USE THEREOF

(71) Applicant: CENTER FOR ABRASIVES AND REFRACTORIES RESEARCH AND DEVELOPMENT C.A.R.R.D. GMBH, Villach (AT)

(72) Inventors: Reiner Kunz, Laufenburg (DE); Steffen Möhmel, Villach (AT)

(73) Assignee: Center for Abrasives and Refractories Research and Development C.A.R.R.D. GmbH, Villach (AT)

( * ) Notice: Subject to any disclaimer, the term of this patent is extended or adjusted under 35 U.S.C. 154(b) by 0 days.

(21) Appl. No.: 15/021,387

(22) PCT Filed: Oct. 1, 2014

(86) PCT No.: PCT/EP2014/071017
§ 371 (c)(1),
(2) Date: Mar. 11, 2016

(87) PCT Pub. No.: WO2015/049273
PCT Pub. Date: Apr. 9, 2015

(65) Prior Publication Data
US 2016/0222264 A1    Aug. 4, 2016

(30) Foreign Application Priority Data
Oct. 4, 2013 (DE) .......... 10 2013 111 006

(51) Int. Cl.
| | |
|---|---|
| *C09K 3/14* | (2006.01) |
| *C04B 35/111* | (2006.01) |
| *B24D 3/00* | (2006.01) |
| *C01F 7/02* | (2006.01) |
| *C04B 35/107* | (2006.01) |
| *C04B 35/626* | (2006.01) |
| *C04B 38/00* | (2006.01) |
| *B24D 5/12* | (2006.01) |

(52) U.S. Cl.
CPC .............. *C09K 3/1418* (2013.01); *B24D 3/00* (2013.01); *B24D 5/12* (2013.01); *C01F 7/02* (2013.01); *C01F 7/027* (2013.01); *C04B 35/107* (2013.01); *C04B 35/111* (2013.01); *C04B 35/6261* (2013.01); *C04B 35/62665* (2013.01); *C04B 38/00* (2013.01); *C09K 3/1427* (2013.01); *C01P 2002/60* (2013.01); *C01P 2006/14* (2013.01); *C01P 2006/16* (2013.01); *C01P 2006/80* (2013.01); *C04B 2235/3201* (2013.01); *C04B 2235/3206* (2013.01); *C04B 2235/3224* (2013.01); *C04B 2235/3232* (2013.01); *C04B 2235/3241* (2013.01); *C04B 2235/3244* (2013.01); *C04B 2235/3267* (2013.01); *C04B 2235/3272* (2013.01); *C04B 2235/3275* (2013.01); *C04B 2235/3279* (2013.01); *C04B 2235/3284* (2013.01); *C04B 2235/3418* (2013.01); *C04B 2235/5427* (2013.01); *C04B 2235/5436* (2013.01); *C04B 2235/5463* (2013.01); *C04B 2235/72* (2013.01); *C04B 2235/786* (2013.01)

(58) Field of Classification Search
CPC ......... C09K 3/1418; C09K 3/14; C04B 35/11; C01F 7/14
See application file for complete search history.

(56) References Cited

U.S. PATENT DOCUMENTS

| | | | |
|---|---|---|---|
| 4,157,898 A | 6/1979 | Walker et al. | |
| 7,168,267 B2 * | 1/2007 | Rosenflanz | C03B 19/06 264/319 |
| 2002/0160694 A1 * | 10/2002 | Wood | B24D 3/04 451/41 |
| 2004/0049990 A1 * | 3/2004 | Skale | C04B 35/1115 51/309 |
| 2011/0131889 A1 * | 6/2011 | Querel | B24D 3/06 51/308 |

FOREIGN PATENT DOCUMENTS

| | | |
|---|---|---|
| EP | 1 339 809 B1 | 3/2007 |
| WO | WO 2012/041421 A1 | 4/2012 |

OTHER PUBLICATIONS

International Search Report and Written Opinion issued Jan. 28, 2015, in International Application No. PCT/EP2014/071017 (12 pgs.).

* cited by examiner

*Primary Examiner* — Pegah Parvini
(74) *Attorney, Agent, or Firm* — Finnegan, Henderson, Farabow, Garrett & Dunner LLP

(57) ABSTRACT

The present invention relates to temperature-treated polycrystalline porous $Al_2O_3$ bodies comprising an amount of α aluminum oxide of more than 97% by weight, an amount of other oxide alloying components of a total of less than 3% by weight, a macroporosity of between 5 and 30% by volume, wherein the $Al_2O_3$ bodies are composed of a plurality of $Al_2O_3$ primary crystals comprising a crystallite size of between 20 and 100 μm.

8 Claims, 3 Drawing Sheets

Figure 1:
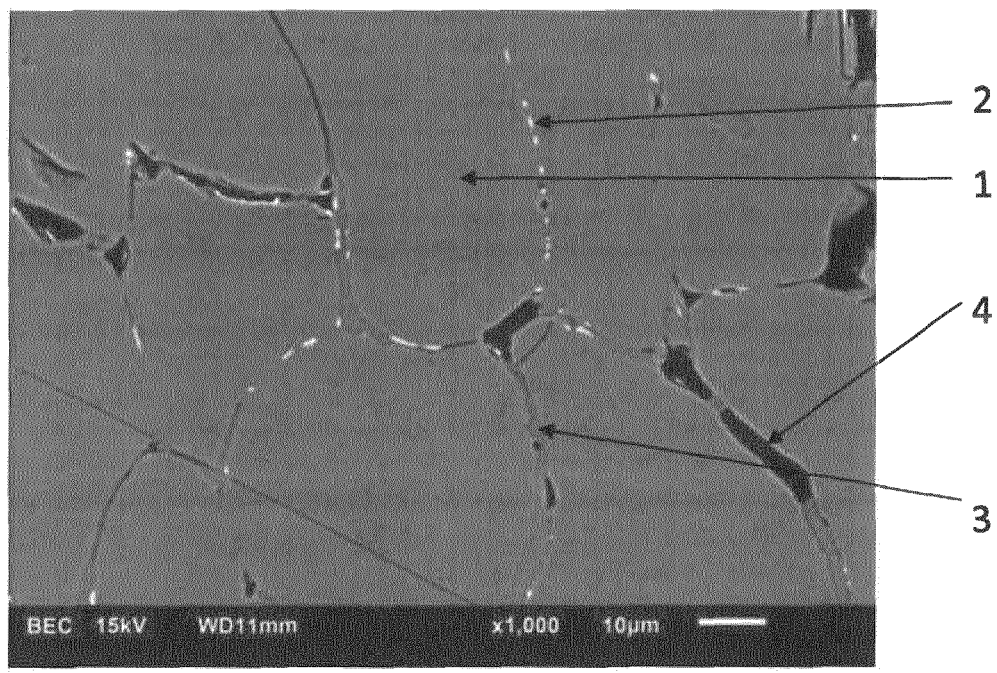

POLYCRYSTALLINE POROUS AL$_2$O$_3$—BODIES ON THE BASIS OF MOLTEN ALUMINUM OXIDE COMPRISING AN INCREASED TOUGHNESS AND USE THEREOF

CLAIM FOR PRIORITY

This application is a U.S. national phase entry under 35 U.S.C. §371 from PCT International Application No. PCT/EP2014/071017, filed Oct. 1, 2014, which claims the benefit of priority of German Patent Application No. 10 2013 111 006.1, filed Oct. 4, 2013, the subject matter of both of which is incorporated herein by reference.

The present invention relates to polycrystalline porous Al$_2$O$_3$ bodies on the basis of molten aluminum oxide, to a method for the production and use thereof, in particular in abrasives.

Abrasive grains on the basis of molten aluminum oxide, which is often also referred to in the literature as corundum, have been known for a long time and still belong to the most commonly used materials for machining surfaces today. Due to the plurality of the different materials, such as, e.g., wood, steel, stainless steel, plastics, stone, ceramics, among others, which are to be machined, types of corundum or special corundum, respectively, which match the respective applications and the physical characteristics of which were optimized for the corresponding case, were developed in the past.

For that purpose, different processes can be chosen, wherein the corundum is either doped with other oxides and/or the production process is varied, so as to change in particular the physical characteristics of the abrasive grain, and/or to also subject the resulting abrasive grain to a post-treatment, so as to obtain special characteristics or so as to intensify them.

WO 2012/041421 discloses polycrystalline Al$_2$O$_3$ bodies, which are produced by melting aluminum oxide in an electric arc furnace and by subsequently pouring off the liquid melt. The pouring flow is thereby cooled do quickly, for the purpose of which the liquid melt is poured into a gap between two water-cooled rollers, for example, which rotate in opposite direction. To increase the cool-down speed, fine-particle aluminum oxide particles are additionally added to the pouring flow.

The solid material obtained in this manner is subsequently comminuted and treated to abrasive grit size by means of screening. Abrasive grains, which have a closed macroporosity and which are composed of individual primary crystals, which are connected to one another and which comprise a crystallite size of between 20 μm and 100 μm, are obtained in this manner. Such abrasive grains comprising a defined porosity and a defined crystalline structure have advantages, in particular for use in grinding discs.

EP-B-1 339 809 describes a method for producing a compact dense abrasive grain on the basis of alumina comprising an increased toughness as well as the use thereof in abrasives. The finished abrasive grit is thereby subjected to a thermal post-treatment of between 800 and 1500° C.

Thermal post-treatments are also known from U.S. Pat. No. 4,157,898. TiO$_2$-containing corundum is annealed under oxidizing conditions, wherein titanium suboxide, which is formed from the TiO$_2$ during the melt, which is carried out under reducing conditions, is oxidized at the grain surface and titanium-aluminum compounds are formed, which comprise quadrivalent titanium and which effect a blue coloration of the surface of the abrasive grains.

In both of the latter cases, finished abrasive grains, which are composed so as to be compact and dense, are thermally post-treated, so as to increase the grain toughness thereof. In the case of certain grinding operations, the increase of the grain toughness correlates with an increase of the grinding performance.

In addition to the abrasive grains, which are composed so as to be compact and dense and which consist of very few large or individual crystallites, a number of abrasive grains, which are composed so as to be microcrystalline or polycrystalline and which are composed of a plurality of smaller crystallites and which have a high toughness based on the crystalline structure or the structure thereof alone, have been developed in particular in recent times. For instance, EP-B-1 595 081 describes the production of alumina zirconia, wherein zirconium oxide is melted together with aluminum oxide and the liquid melt is then cooled do as quickly as possible, so as to prevent a segregation of the components when cooling do:, so that ZrO$_2$ and Al$_2$O$_3$ are present in the product so as to be distributed homogenously next to one another in a microcrystalline structure.

Similar tough materials, which are also composed so as to be microcrystalline, can also be obtained via a chemical or ceramic process, respectively, wherein fine-particle fused alumina or a corresponding raw material, from which Al$_2$O$_3$ results during the production process, is processed to form a green body, which is then sintered at temperatures of between 1200 and 1600° C. Microcrystalline sintered corundum, for example, is the subject matter of EP-B-0 152 068 or of EP-A-0 725 045.

In the past, a thermal post-treatment of this microcrystalline or polycrystalline corundum has been avoided, because experience showed that the crystalline structure, which is responsible for the toughness, sustains damage in response to a thermal post-treatment due to crystal growth or, as in the case of the alumina zirconia, also due to modification transformations.

Successful thermal post-treatments are thus currently only known for compact and dense types of corundum consisting of a few large or single crystallites.

Due to the enormous range of the different materials, surfaces and shapes, which are to be machined, as well as due to the different demands on the machining process itself, not only the types of corundum, which are specified above in an exemplary manner, are preferably used, but there is furthermore also still a need to better adapt abrasive grains to certain grinding operations or to special materials, so as to thus further improve the removal rate or the surface quality when machining the materials.

It is thus the task of the present invention to provide a corundum abrasive grain, which has a characteristic profile, which is optimized for certain grinding operations and which thus allows for a further optimization of the abrasive produced therefrom and of the grinding results.

It is also the task of the present invention to provide a method for producing a corresponding corundum abrasive grain.

The problem is solved by providing polycrystalline porous Al$_2$O$_3$ bodies on the basis of molten aluminum oxide comprising an amount of α aluminum oxide of more than 97% by weight and an amount of other oxide alloying components of a total of less than 3% by weight.

The Al$_2$O$_3$ bodies are comprised of a plurality of Al$_2$O$_3$ primary crystals comprising a crystallite size of between 20 and 100 μm and exhibit a macroporosity comprising a pore volume of between 5 and 30% by volume, an average diameter of the pores of between 20 and 60 μm, and a maximum pore diameter in the range of approx. 100 µm. At the boundaries of the primary crystals, the polycrystalline $Al_2O_3$ bodies exhibit concentrations of individual extrinsic phases, which are distributed individually in a punctiform manner or also in lines along the primary crystal boundaries. The extrinsic phases have a diameter of less than 7 µm, preferably less than 5 µm.

In a preferred embodiment of the present invention, the extrinsic phases comprise $TiO_2$ and/or other oxide alloying components selected from the group consisting of $Cr_2O_3$, $Fe_2O_3$, MgO, $Na_2O$, NiO, ZnO, CoO, $ZrO_2$, $SiO_2$, $MnO_2$ or oxides of rare earths.

The above-described polycrystalline $Al_2O_3$ bodies are obtained by means of a the al post-treatment of polycrystalline $Al_2O_3$ bodies comprising small quantities of $TiO_2$ and/or of other oxide alloying components, as can be produced according to WO 2012/041421, for example.

The production of the abrasive grains according to the invention on the basis of polycrystalline $Al_2O_3$ bodies comprises a sequence of process steps, starting with the melting of a mixture of at least 97% by weight of aluminum oxide and at most 3% by weight of other oxide alloying components in an electric arc furnace. After completely melting the mixture, the liquid melt is poured off at a constant pouring rate of less than 80 kg/min. When pouring, fine α aluminum oxide particles are added to the pouring stream. The cool-down of the melt is accelerated in this manner. The complete cool-down of the melt then takes place by pouring the melt into a narrow gap between metal plates, via cooled rollers, which rotate in opposite direction, or also by pouring off onto cooling plates. After the cool-do polycrystalline $Al_2O_3$ bodies are present in the form of coarse pieces or plates, which are then comminuted and are subsequently screened to a defined abrasive grit size. The essential step for the invention is the subsequent tempering of the abrasive grains, which are obtained in this manner, for 5-60 minutes at a temperature of between 1000 and 1400° C. Preferably, the thermal post-treatment takes place for 15 minutes at 1250° C. in a rotary kiln.

As result of the tests, which were carried out in the context of the present invention, it was found that the previous comminuting and screening of the finished abrasive grit prior to the tempering has a significant impact on the quality of the abrasive grain according to the invention. It was thus found that even though a tempering of the coarse pieces, which were obtained after the cool-down, and a subsequent comminuting also results in an improvement of the characteristics of the abrasive grain, but that said improvement is by far not as dramatic as in the reverse order. The shape of the abrasive grain, which is obtained after comminuting, is cubic and blocky, wherein, due to the macroporosity of the base $Al_2O_3$ bodies, the finished abrasive grit, however, exhibits a relatively low bulk density, which is less than 1.75 g/cm³, preferably less than 1.70 g/cm³, and more preferably less than 1.65 g/cm³, for the grit sizes F24-F80 according to FEPA.

Surprisingly, it was now found that an enormous increase of the grain toughness can be obtained by means of a they al post-treatment even in the case of polycrystalline porous $Al_2O_3$ bodies, in spite of the crystalline structure thereof and the porosity thereof, when the base products encompass small quantities of extrinsic oxides as alloying components. This effect is particularly remarkable and pronounced in the presence of small quantities of $TiO_2$.

In addition to $TiO_2$, small portions of additional oxide alloying components selected from the group consisting of $Cr_2O_3$, $Fe_2O_3$, MgO, $Na_2O$, NiO, ZnO, CoO, $ZrO_2$, $SiO_2$, $MnO_2$ and/or oxides of rare earths can also be present in the polycrystalline $Al_2O_3$ bodies according to the invention, wherein the sum of the additional alloying components is less than 3% by weight, preferably ≤1% by weight. A positive effect, which, however, is not very pronounced, can also be observed when the extrinsic phases do not include $TiO_2$.

The character of the present invention is additionally illustrated by means of REM images, which are enclosed to the description as FIGS. 1 to 6.

Figure 2:
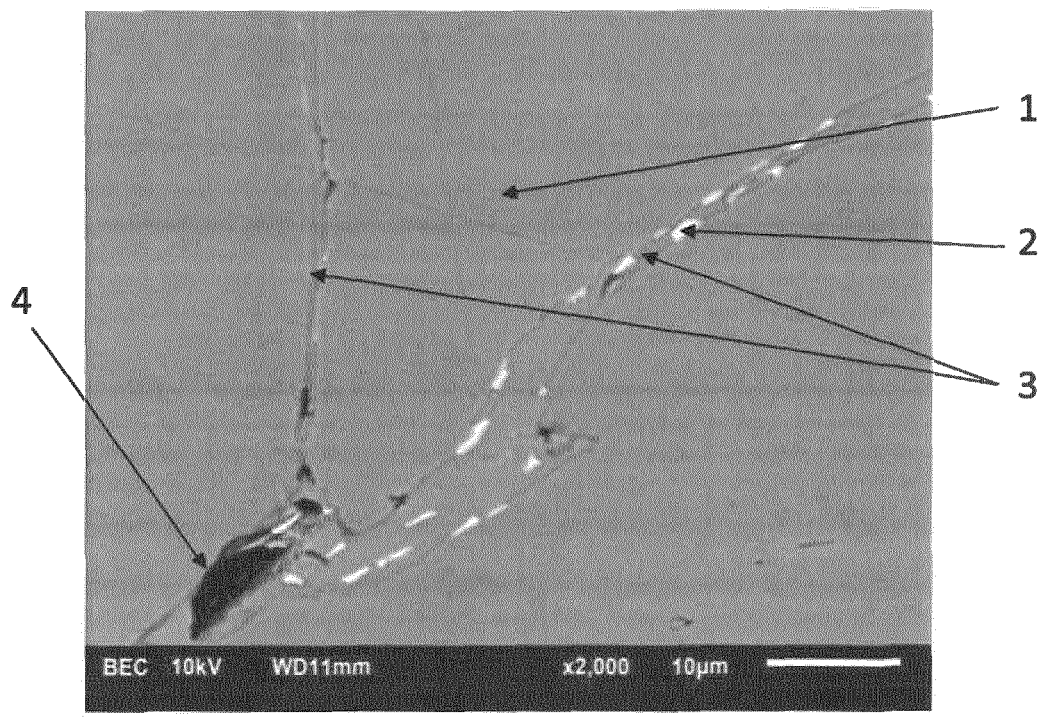
Figure 3:
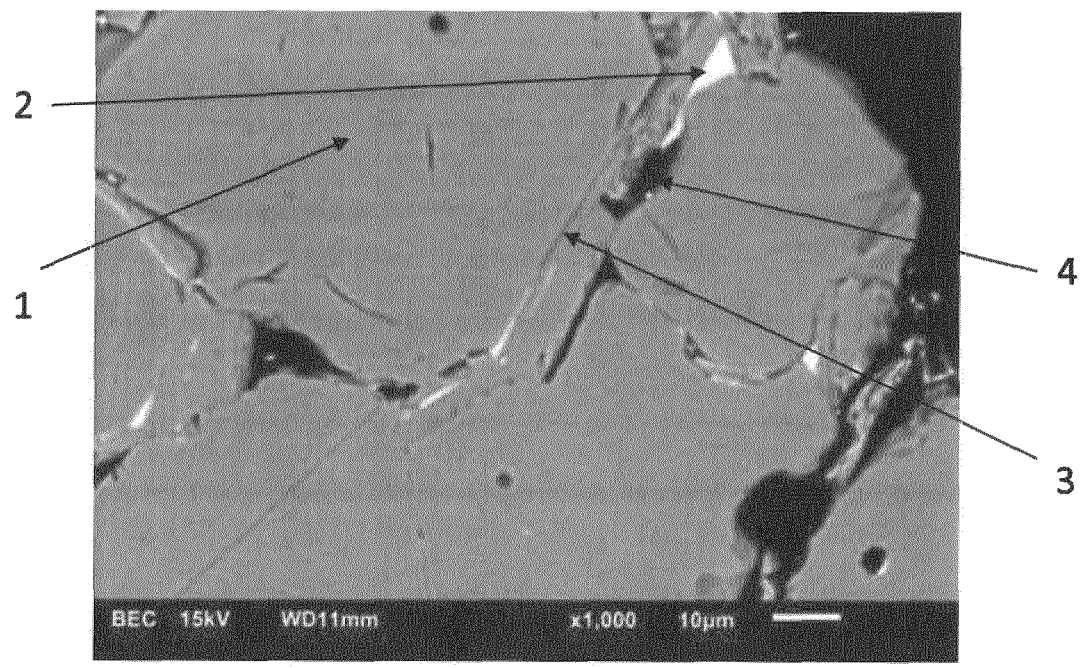
Figure 4:
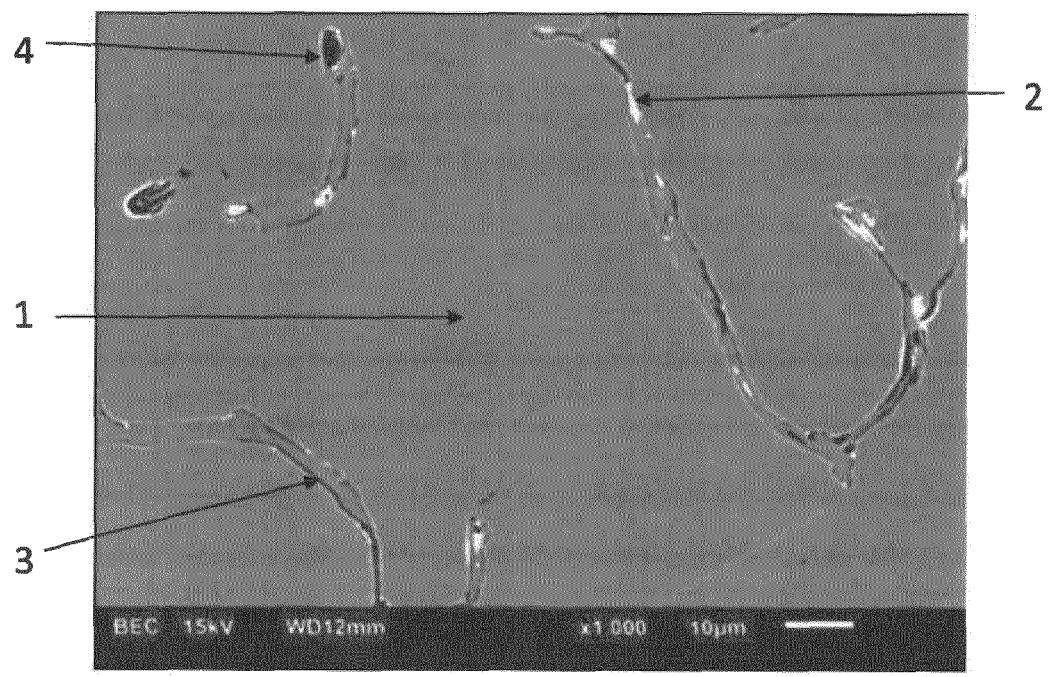
Figure 5:
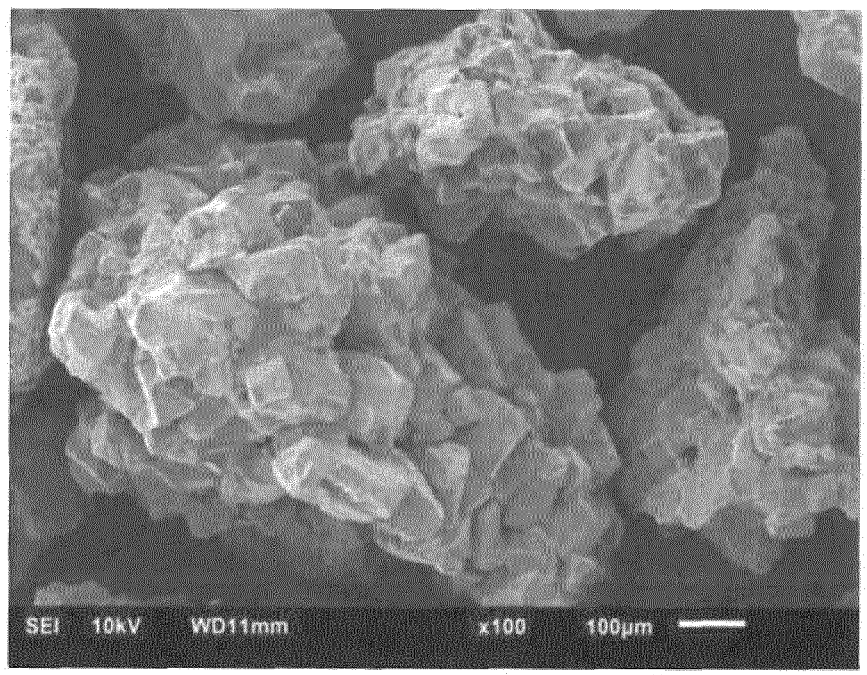
Figure 6:
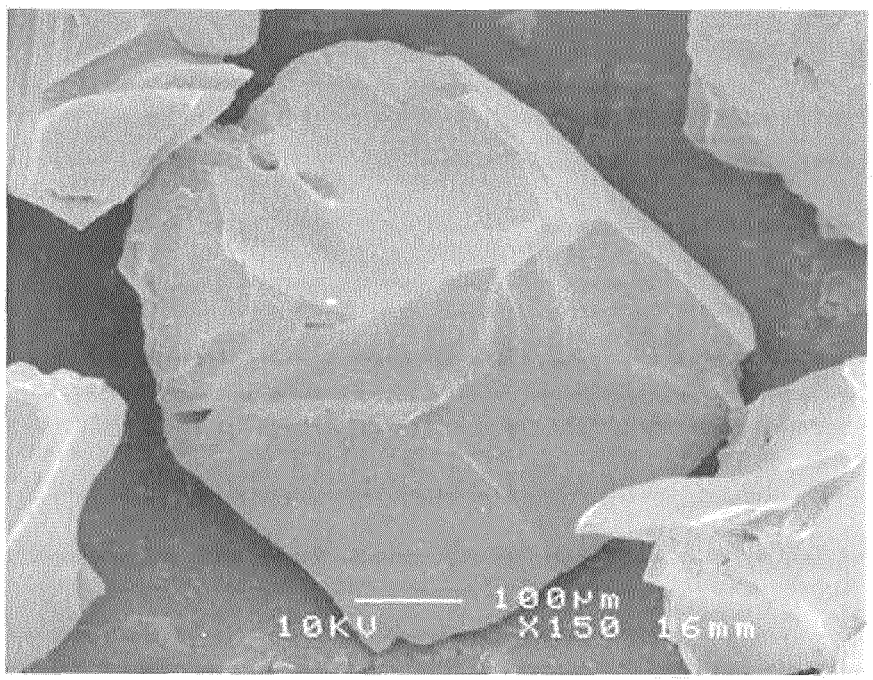

FIG. 1 shows a scanning electron micrograph of a polished section of a polycrystalline abrasive grain according to the invention in 1000-fold magnification, FIG. 2 shows a scanning electron micrograph of a polished section of a polycrystalline abrasive grain according to the invention in 2000-fold magnification, FIG. 3 shows a scanning electron micrograph of a polished section of a comparative example in 1000-fold magnification, FIG. 4 shows a scanning electron micrograph of a polished section of a comparative example in 1000-fold magnification, FIG. 5 shows a scanning electron micrograph of polycrystalline abrasive grains in 100-fold magnification, FIG. 6 shows a scanning electron micrograph of compact dense monocrystalline abrasive grains in 150-fold magnification.

The boundaries 3 of the primary crystals 1 can be identified in FIGS. 1 and 2 as dark border areas, which surround the individual primary crystals 1. The crystal boundaries are additionally highlighted by means of the increasingly appearing individual light extrinsic phases 2 which comprise in the present case more than 88% by weight of $TiO_2$ (example 4). An EDX analysis of the extrinsic phases 2 thus resulted in a composition of 88.6% by weight of $TiO_2$, 0.7% by weight of $Na_2O$, 0.1% by weight of MgO, 0.1% by weight of $SiO_2$ and 10.5% by weight of $Al_2O_3$. For the primary crystals 1, 99.5% by weight of $Al_2O_3$, 0.3% by weight of $SiO_2$ and in each case 0.1% by weight of CaO and $TiO_2$ were analyzed. For the phase boundaries 3, 5.6% by weight of $Na_2O$, 93.4% by weight of $Al_2O_3$, 0.2% by weight of $SiO_2$ and 0.8% by weight of $TiO_2$ were found. The black areas, which can be identified in the image, are pores 4, which form along the primary crystalline boundaries. FIG. 2 shows a polished section of an abrasive grain in 2000-fold magnification, in the case of which in particular the $TiO_2$-containing extrinsic phases 2, which are lined up along the crystallite boundary 3, can be seen.

FIGS. 3 and 4 show a section through a base grain prior to the thermal treatment. Compared to the thermally post-treated grain according to the invention illustrated in FIG. 1 or 2, it can be seen that the quantity of the titanium-containing extrinsic phases 2 is considerably lower, the separations are coarser, and the shape of the separations is more platelet-like. It is thus assumed that the high temperature of the thermal post-treatment leads to diffusion processes, which leads to an increased separation and to a finer punctiform distribution of the extrinsic phases 2. It also appears that the temperature treatment or the diffusion effects, respectively, lead to a decrease of the thickness of the phase boundaries 3.

The polycrystalline composition of the abrasive grains according to the invention, which are comprised of $Al_2O_3$ primary crystals having a size of 20-100 µm and which are connected to one another, can be seen in FIG. 5 in 100-fold magnification. The fissured surface of the abrasive grains explains the good embedding thereof in a binding agent matrix of an abrasive and the good grinding performance resulting therefrom.

A conventional dense compact abrasive grain, which is composed so as to be monocrystalline and which has a relatively smooth surface, can be seen in FIG. 6 in a 150-fold magnification as significant contrast to FIG. 5, so that the abrasive grain exhibits indeed high grain strength, but it is only poorly embedded in the binding agent matrix.

To evaluate the quality of abrasive grains, it is essential to carry out grinding tests. Grinding tests are relative extensive and time-intensive. In the abrasive industry, it is thus common to evaluate the quality of abrasive grains in advance by means of mechanical characteristics, which can be accessed more easily and which serve as indications for the later behavior in the grinding test. In the context of the present works, the grain toughness of the abrasive grains was determined via the micro grain decomposition by milling in a ball mill.

Micro Grain Decomposition (MKZ)

To measure the micro grain decomposition, 10 g of corundum (of a corresponding grit size) is milled in a ball mill, which is filled with 12 steel balls (diameter 15 mm, weight 330-332 g) at 188 revolutions per minute for a predetermined period of time. The milled grain is subsequently screened in a screening machine (Haver B□cker EHL 200) for 5 minutes via a corresponding fine sieve, which is 2 classes finer than the bottom sieve, which is defined for the corresponding grit size, and the fine portion is balanced out. The MKZ value follows from:

$$MKZ(\%) = \frac{\text{sieve pass-through}}{\text{total weight}} \times 100$$

In Table 1 below, several selected types of corundum are characterized, the micro grain decomposition of which, in addition to the bulk density, are then summarized in Table 2 and are compared to the abrasive grains according to the invention. Corundum from Treibacher Schleifmittel GmbH is used for the tests. For comparison, blocky and dense fused aluminum oxides (FIG. 6), which are melted in a batch process, were also used in addition to polycrystalline corundum. The temperature treatment for the polycrystalline corundum was carried out for 15 minutes at 1250° C. in a rotary kiln.

TABLE 1

| Example | Type of Corundum | Chemical Composition | |
|---|---|---|---|
| 1 (comparison) | White fused aluminum oxide compact, dense monocrystalline | $Al_2O_3$ $Fe_2O_3$ $Na_2O$ $SiO_2$ | 99.76 0.04 0.18 0.02 |
| 2 (comparison) | alloyed corundum compact, dense monocrystalline | $Al_2O_3$ $Na_2O$ $Fe_2O_3$ | 99.38 0.19 0.04 |
| 3, 5, 7 (comparison) | alloyed corundum polycrystalline | $TiO_2$ $Cr_2O_3$ | 0.24 0.09 |
| 4, 6, 8 (invention) | alloyed corundum temperature-treated polycrystalline | $SiO_2$ | 0.06 |

TABLE 2

| Example | Grit Size | Bulk Density SD (g/cm³) | Micro Grain Decomposition MKZ (% by weight) |
|---|---|---|---|
| 1 | F46 | 1.81 | 12.1 |
| 2 | F46 | 1.81 | 9.7 |
| 3 | F46 | 1.64 | 29.6 |
| 4 | F46 | 1.64 | 20.2 |
| 5 | F60 | 1.67 | 18.1 |
| 6 | F60 | 1.67 | 13.8 |
| 7 | F80 | 1.63 | 13.4 |
| 8 | F80 | 1.63 | 7.5 |

For the blocky and dense fused corundum (example 1 and 2), the low MKZ values show a high toughness and grain strength, which is considerably higher for the alloyed corundum (example 2) than for the white fused aluminum oxide (example 1). In the case of the same chemical composition as in example 2, the MKZ value for the polycrystalline porous corundum (example 3) is considerably higher. In response to corresponding applications, this material nonetheless shows very good grinding performance, which in particular also results from the fact that, due to its porous composition, the abrasive grain can be embedded very well in the abrasive (grinding belt or grinding disc), wherein the binding agent penetrates into the outer open pores of the abrasive grain and the abrasive grain is anchored in the abrasive.

After a temperature treatment at 1250° C., the same grain shows a decrease of the MKZ value or an increase of the grain toughness, respectively, by approx. 32%. Completely new application possibilities follow from this for the abrasive grain according to the invention, because the porous polycrystalline structure is now paired with relatively high grain toughness and the advantages of the good embedding can thus be combined with high grain strength.

It is known that the MKZ values are a function of the grain size. Further measurements were thus carried out with finer grit sizes. In the case of examples 5-8, it also became apparent for grit sizes F60 and F80 that enormous increases of the grain toughness are obtained by means of a thermal post-treatment. A grain toughness increase of approx. 24% is thus measured for grit size F60 (examples 5 and 6), while even an increase by approx. 44% can be observed for grit size F80.

Ball Mill Grain Decomposition (KMKZ)

The ball mill grain decomposition is a similar method for measuring the grain strength. Because of the larger sample quantities this method is more exact and less fault-prone. 100 g of corundum (of a corresponding grit size) are milled in a ball mill, which is filled with 8 big 35 mm diameter and 40 to 45 small 14.7 mm diameter steel balls at 83 revolutions per minute for a predetermined period of time. After separating the steel balls, the milled grain is subsequently screened in a Rotap screening machine for 5 minutes via a corresponding fine sieve, which is 2 classes finer than the bottom sieve, which is defined for the corresponding grit size, and the fine portion is balanced out. The KMKZ value follows from:

$$KMKZ(\%) = \frac{\text{sieve pass-through}}{\text{total weight}} \times 100$$

In the present case unalloyed polycrystalline corundum was compared with $TiO_2$ alloyed polycrystalline corundum. The chemical compositions of both types of corundum are summarized in table 1A

TABLE 1A

| Example | Type of Corundum | Chemical Composition | |
|---|---|---|---|
| 9, 13, 17 (comparison) | unalloyed polycrystalline corundum | $Al_2O_3$ | 99.71 |
| | | $Fe_2O_3$ | 0.04 |
| 10, 14, 18 (comparison) | unalloyed polycrystalline corundum temperature-treated | $Na_2O$ | 0.21 |
| | | $SiO_2$ | 0.04 |
| 11, 15, 19 (comparison) | alloyed corundum polycrystalline | $Al_2O_3$ | 99.37 |
| | | $Na_2O$ | 0.20 |
| 12, 16, 20 (invention) | alloyed polycrystalline corundum temperature-treated | $Fe_2O_3$ | 0.04 |
| | | $TiO_2$ | 0.28 |
| | | $Cr_2O_3$ | 0.06 |
| | | $SiO_2$ | 0.05 |

TABLE 2A

| Example | Grit Size | Bulk Density SD (g/cm³) | Ball Mill Grain Decomposition KMKZ(% by weight) | Grain strength Improvement (%) |
|---|---|---|---|---|
| 9 | F46 | 1.61 | 23 | — |
| 10 | F46 | 1.61 | 21 | 9 |
| 11 | F46 | 1.63 | 24 | — |
| 12 | F46 | 1.63 | 13 | 53 |
| 13 | F60 | 1.60 | 33 | — |
| 14 | F60 | 1.60 | 28 | 14 |
| 15 | F60 | 1.62 | 34 | — |
| 16 | F60 | 1.62 | 15 | 56 |
| 17 | F80 | 1.66 | 9 | — |
| 18 | F80 | 1.66 | 8 | 12 |
| 19 | F80 | 1.66 | 11 | — |
| 20 | F80 | 1.66 | 5 | 55 |

The temperature treatment of the polycrystalline corundum was carried out in a rotary kiln at 1250° C. for 15 minutes. The results of the ball mill grain decomposition are summarized in table 2A. It was found out that the untreated polycrystalline corundum has comparable grain strength irrespective whether it is alloyed or unalloyed. Both types of corundum exhibit an improvement of grain strength after temperature-treatment, whereby the improvement for unalloyed polycrystalline corundum is below 20%, whereas the grain strength of the alloyed polycrystalline corundum increases more than 50%.

Grinding Test

To also verify the positive effect of the MKZ values for the praxis grinding praxis, additional grinding tests were carried out from the samples 1 to 4.

For this purpose, cutting discs were produced in the dimensions 125×1.5×22.23, which were then used to cut a stainless steel tube comprising the diameter of 20 mm and a thickness of 2 mm. 3 rough cuts were made initially for conditioning the disc and a total of 20 cuts were subsequently made with each disc. The grinding performance was determined via the decrease of the disc diameter (disc wear). The average values were in each case formed from 3 discs in response to the disc wear. The grinding results and the grinding conditions are summarized in Table 3 below.

TABLE 3

| Grinding machine | FEIN WS14 | | |
|---|---|---|---|
| Power | 1.2 kW | | |
| Speed | 8.800 rpm | | |
| Cutting rate | 20 | | |
| Workpiece | tube 22/2 | | |
| Material | stainless steel | | |
| | | dimension | disc wear after 20 cuts (decrease of the diameter) |
| Abrasive | cutting disc | 125 × 1.5 × 22.23 | |
| | abrasive grain | example 1 | 8.4 mm |
| | | example 2 | 4.5 mm |
| | | example 3 | 5.4 mm |
| | | example 4 | 3.9 mm |

In the case of the above-listed grinding conditions, the cutting disc comprising the compact and dense white fused aluminum oxide shows the highest disc wear, which can be explained with the inferior embedding of the compact grain in the binding agent matrix and in particular with the relatively low grain toughness. Compared thereto, the cutting disc comprising the tough alloyed corundum wears considerably less (approx. 45%). The result of the cutting disc comprising polycrystalline porous corundum, which shows a disc wear, which, in spite of the very high MKZ value (example 3=29.6), is only slightly lower as compared to the compact and tough grain from example (2), is surprising and can surely be explained with the good embedding of the porous polycrystalline grain in the binding agent matrix. By tempering the abrasive grain at 1250° C. for 15 minutes, the stability of the cutting disc, based on the decrease of the diameter, can be increased by approx. 30% and thus exceeds the extremely solid compact alloyed corundum.

It is important to note in this context that the above-described grinding test was mainly carried out so as to generally determine the suitability of the $Al_2O_3$ bodies according to the invention as abrasive grains and so as to show the performance increase as compared to the untreated abrasive grain. For specific applications and grinding operations, in the case of which the porosity and the relatively high grain toughness of the abrasive grain according to the invention have a particularly positive impact, further performance increases in particular as compared to the compact and dense corundum types, are to be expected. Corresponding results were found for the precision grinding or also for the high-performance grinding with ceramic-bonded abrasive grains.

In particular when used in abrasive discs, which should have a defined porosity, the use of the abrasive grains according to the invention leads to improvements as compared to the state of the art, because the desired porosity is now at least partially embodied by the abrasive grain itself, which is associated with the additional advantage that the cooling lubricant can be brought directly into the abrasive contact zone. On the one hand, the cutting ability of the abrasive disc is improved and the free cutting during the operating process is supported by introducing additional porosity in response to the use of the abrasive grain according to the invention. On the other hand, the embedding of the abrasive grain in the grinding disc is furthermore improved due to the polycrystalline structure comprising a large, fissured surface, whereby the grinding performance is additionally increased.

In spite of the high macroporosity, the abrasive grain is extremely stable and can also be used for grinding operations, in the case of which high contact pressures are applied. Even if, due to their composition, the polycrystalline $Al_2O_3$ bodies are predestined in particular for the use in grinding discs, they are also suitable for use as loose abrasive, for use in coated abrasives, for the production of refractory materials and for use as wear protection materials.

The invention claimed is:

1. Polycrystalline porous $Al_2O_3$ bodies of molten aluminum oxide comprising
    an amount of a aluminum oxide of more than 97% by weight: and
    an amount of other oxide alloying components of a total of less than 3% by weight, wherein
    the $Al_2O_3$ bodies comprise a plurality of $Al_2O_3$ primary crystals having a crystalline size of between 20 and 100 µm,
    the $Al_2O_3$ bodies exhibit a macroporosity comprising a pore volume of between 5 and 30% by volume, an average diameter of the pores of between 5 and 30% by volume, an average diameter of the pores of between 20 and 60 µm and a maximum pore diameter in the range of approx. 100 µm, and
    at the boundaries of the primary crystals, the polycrystalline $Al_2O_3$ bodies comprise concentrations of individual $TiO_2$ comprising extrinsic phases, the extrinsic phases have a diameter of less than 7 µm and are distributed individually either in a punctiform manner or in lines along the primary crystal boundaries.

2. The $Al_2O_3$ bodies according to claim 1, wherein the extrinsic phases have a diameter of less than 5 µm.

3. The $Al_2O_3$ bodies according to claim 1, wherein the extrinsic phases comprise beside $TiO_2$ other oxide alloying components selected from the group consisting of $Cr_2O_3$, $Fe_2O_3$, MgO, $Na_2O$, NiO, ZnO, CoO, $ZrO_2$, $SiO_2$, $MnO_2$, or oxides of rare earths.

4. The $Al_2O_3$ bodies according to claim 1, wherein the amount of other oxide alloying components is less than 1% by weight.

5. The $Al_2O_3$ bodies according to claim 1, wherein the $Al_2O_3$ bodies are abrasive grains, which are treated and sized into defined grit sizes.

6. The $Al_2O_3$ bodies according to claim 5, wherein the abrasive grains have a bulk density of less than 175 $g/cm_3$ in the grit sizes F24-F80 according to FEPA.

7. The $Al_2O_3$ bodies according to claim 5, wherein the abrasive grains have a bulk density of less than 1.70 g/cm3 in the grit sizes F24-F80 according to FEPA.

8. The $Al_2O_3$ bodies according to claim 5, wherein the abrasive grains have a bulk density of less than 1.65 g/cm3 in the grit sizes F24-F80 according to FEPA.

* * * * *